United States Patent
Ford et al.

(10) Patent No.: US 7,898,986 B2
(45) Date of Patent: Mar. 1, 2011

(54) PORT CONFIGURATION

(75) Inventors: Daniel E. Ford, Granite Bay, CA (US);
Ballard C. Bare, Auburn, CA (US);
Scott A. Gulland, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 523 days.

(21) Appl. No.: 11/590,499

(22) Filed: Oct. 31, 2006

(65) Prior Publication Data
US 2008/0104278 A1   May 1, 2008

(51) Int. Cl.
*H04L 12/28* (2006.01)
(52) U.S. Cl. .................... 370/255; 370/401
(58) Field of Classification Search ......... 370/254–255, 370/400, 401
See application file for complete search history.

(56) References Cited

U.S. PATENT DOCUMENTS

| | | | | |
|---|---|---|---|---|
| 6,498,781 B1 * | 12/2002 | Bass et al. | ............... | 370/230.1 |
| 6,693,909 B1 * | 2/2004 | Mo et al. | ............... | 370/392 |
| 6,859,433 B1 * | 2/2005 | Chen et al. | ............... | 370/230 |
| 6,898,202 B2 * | 5/2005 | Gallagher et al. | ............ | 370/401 |
| 7,075,927 B2 * | 7/2006 | Mo et al. | ............... | 370/389 |
| 7,173,912 B2 * | 2/2007 | Jaber et al. | ............... | 370/254 |
| 7,411,915 B1 * | 8/2008 | Spain et al. | ................. | 370/250 |
| 2004/0073600 A1 | 4/2004 | Elo et al. | | |
| 2004/0177098 A1 * | 9/2004 | Tamura et al. | ............... | 707/200 |
| 2005/0204070 A1 | 9/2005 | Shaver et al. | | |
| 2005/0264420 A1 * | 12/2005 | Vogel et al. | ............... | 340/572.1 |
| 2008/0056156 A1 * | 3/2008 | Andrews et al. | ............ | 370/254 |

* cited by examiner

*Primary Examiner*—Hong Cho

(57) ABSTRACT

Methods, computer readable media, and device embodiments are provided for port configuration. One method embodiment includes defining a number of ports for which a number of port configuration properties are to be configured, grouping the number of ports into one or more port configuration groups, and defining the number of port configuration properties to be configured within a particular port configuration group.

18 Claims, 3 Drawing Sheets

```
                220      222
                 ╲        ╲
        <PortDef Range="All">
                     224
                      ╲
             Enable 802.1X (port configuration property)

No LACP

<\PortDef>

<PortDef Range=" Speed="100,1000"> port configuration properties

<\PortDef>

<PortDef Range="M1(1-3), M2(1,2), M3(1)"> port configuration properties

<\PortDef>

<PortDef Range="All" Media="Fiber"> port configuration properties

<\PortDef>
```

*Fig. 2*

PORT CONFIGURATION

BACKGROUND

Computing systems can include multiple computing components such as servers, desktop PCs, laptops, and workstations, among other peripheral devices, (e.g., printing devices, facsimile devices, and scanning devices). In some systems, these components can be networked together across a local area network (LAN) and/or wide area network (WAN). A LAN and/or WAN uses clients and servers that have network-enabled operating systems such as Windows, Mac, Linux, and Unix.

An example of a client includes a user's workstation, among other types of devices. Servers can hold programs and data that are shared by the clients in a computing network. Servers can come in a wide range of capacities and costs, from PC servers to mainframes. Peripherals, such as a printing device, facsimile device, and/or scanning device can be attached locally to a workstation or to a server and be shared by network users.

Data transfer between components over a network can be managed by a transport protocol such as Transmission Control Protocol/Internet Protocol (TCP/IP), among others. The Internet Protocol (IP) layer in TCP/IP contains a network address and allows messages to be routed to a different network or subnetwork (subnet). The physical transmission of such data can be performed by an access method, typically via Ethernet, which can be provided on the motherboard or in the network adapter cards (NICs) plugged into the network devices. The actual communications path can be a twisted pair or optical fiber cable that interconnects each network adapter.

Network components can include Ethernet ports for home use, not just to create a small home network, but to connect to the Internet via a DSL or cable modem among other uses. An Ethernet port typically can support both 10BaseT at 10 megabits per second (Mbps) and 10BaseT at 100 Mbps, among other data transmission modes.

Network components in a LAN and/or WAN can include hardware components, such as trunk lines, switches, routers, hubs, servers, and databases. LANs and/or WANs can also include instructions such as software, application modules, firmware, and various other types of executable instructions.

Network components such as switches, hubs, and routers, for example, are used to distribute and restrict traffic within workgroups of a network. Network components can also provide filtering of inter or intra network traffic for security purposes and policy management. These sorts of network component functionality can also be incorporated into other components within a network environment, such as a file server, a load balancing device, or other such network appliance.

Any number of network components, such as those mentioned above, may be included in a network. These network components will be generally referred to herein as network devices. When such network devices are added to the network, the device typically has to be configured for use in the network environment.

This typically means configuring the software, firmware, and other instructions on the device to communicate with the other network devices. This configuration typically is accomplished by creating a configuration file for each device or port by typing in the configuration information into the file manually. Such configuration methods may be time consuming, particularly for network administrators that do not add devices to their network often. They may also be error prone since the user will type the configuration information in for each device or port.

BRIEF DESCRIPTION OF THE DRAWINGS

FIG. 2 is an example of a number of port definition blocks that can be utilized in various embodiments of the present disclosure.

DETAILED DESCRIPTION

Embodiments of the present disclosure include systems, devices, methods, and computer readable media for configuring devices. For example, one such method embodiment includes defining a number of ports for which a number of port configuration properties are to be configured, grouping the number of ports into one or more port configuration groups, and defining the number of port configuration properties to be configured within a particular port configuration group.

Embodiments of the present disclosure and features thereof can be performed by software, firmware, hardware, application modules, and the like. These embodiments can use instructions resident on and/or executable by circuits, such as processors or application specific integrated circuits, and can be used in devices and networks shown herein or otherwise.

The embodiments of the present disclosure are not limited to any particular operating environment or to instructions written in any particular programming language. Software, firmware, and/or processing modules, suitable for carrying out embodiments of the present disclosure, can be resident on one or more devices in one or more locations.

Figure 1:
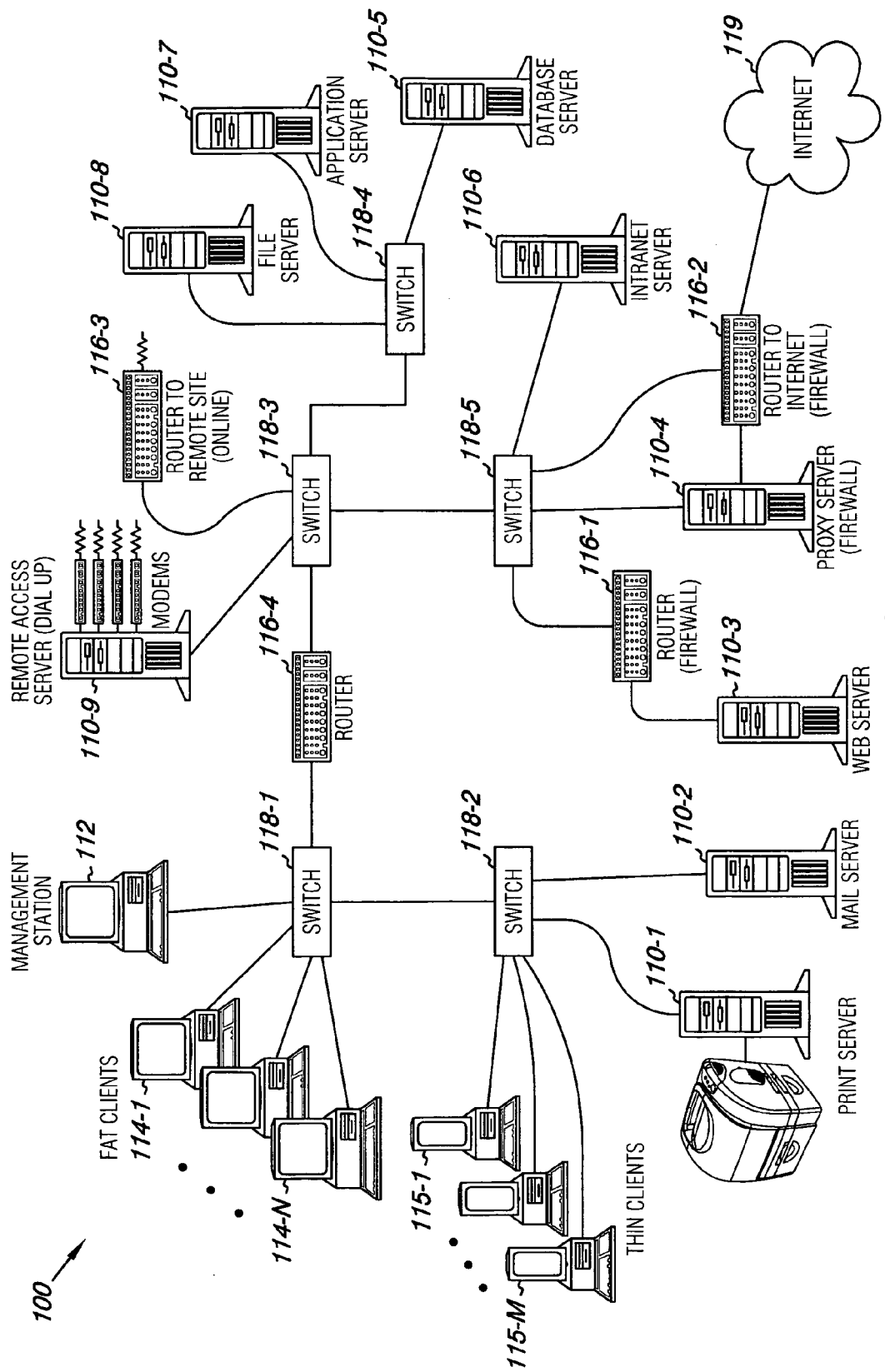
FIG. 1 illustrates a communication network embodiment of the present disclosure.

FIG. 1 illustrates a communication network embodiment of the present disclosure. As shown in FIG. 1, a number of devices (e.g., PCs, servers, peripherals, etc.), can be networked together into a computing device network 100 via a LAN and/or WAN via routers, hubs, switches, and the like (referred to herein as "network devices"). FIG. 1 illustrates clients and servers in a LAN. For example, the embodiment of FIG. 1 shows various servers for various types of service on a LAN. However, embodiments of the present disclosure are not so limited.

The example network of FIG. 1 illustrates a print server 110-1, a mail server 110-2, a web server 110-3, a proxy server (e.g., firewall) 110-4, a database server 110-5, intranet server 110-6, an application server 110-7, a file server 110-8, and a remote access server (e.g., dial up) 110-9. Again, the examples provided here do not provide an exhaustive list of devices that can be part of a network.

The embodiment of FIG. 1 further illustrates a network management server 112 (e.g., a PC or workstation), a number of "fat" clients 114-1, . . . , 114-N which can also include PCs and workstations and/or laptops, and a number of "thin" clients 115-1, . . . , 115-M which can include terminals and/or peripherals such as scanners, facsimile devices, handheld multifunction device, and the like. The designators "N" and "M" are used to indicate that a number of fat or thin clients can be attached to the network 100. The number that N represents can be the same or different from the number represented by M.

As shown in FIG. 1, all of these example network devices can be connected to one another and/or to other networks via routers, 116-1, 116-2, 116-3, and 116-4, and hubs and/or switches 118-1, 118-2, 118-3, 118-4, and 118-5. Embodiments of the disclosure, however, are not limited to the number and/or type of network devices in FIG. 1's illustration.

As one of ordinary skill in the art will appreciate, many of these devices include processor and memory hardware. By way of example and not by way of limitation, the network management server 112 can include a processor and memory. Similarly, the network devices of routers, 116-1, 116-2, 116-3, and 116-4, and hubs and/or switches 118-1, 118-2, 118-3, 118-4, and 118-5 may include processor and memory resources. Embodiments of the disclosure are not limited to the number, type, or size of processor and memory resources of the various devices in the network.

Instructions (e.g., computer executable instructions), as described in more detail below, can reside on the various network devices. For example, computer executable instructions in the form of firmware, software, etc., can be resident on the network 100 in the memory of a network management server 112 and/or one or more routers, 116-1, 116-2, 116-3, and 116-4, and hubs and/or switches 118-1, 118-2, 118-3, 118-4, and 118-5, and can be executable by the processor(s) thereon. As the reader will appreciate, instructions can be resident in a number of locations on various network devices in the network 100 as employed in a distributed computing network.

As one of ordinary skill in the art will appreciate, each network device in a network is associated with a port of a switch to which it is connected. Data frames, or packets, can be transferred between network devices by means of a switch's logic link control (LLC)/media access control (MAC) circuitry, or "engines", associated with each switch port.

The network switch passes data frames received from a transmitting network device to a destination network device based, for example, on the header information in the received data frame. The switch can also link a given network to other networks through one or more pre-designated switch ports.

Configuration files can be provided to the various network components such as network devices 118-1, 118-2, 118-3, 118-4, and 118-5, among others, in various manners. For example, one or more configuration files can be downloaded from the management station 112 over a wired and/or wireless network infrastructure.

In such instances, the network can employ a particular software interface application to download the one or more files (e.g., an initial and/or subsequent configuration) from the management station 112 to respective memories among the various number and types of network devices illustrated in FIG. 1. This process can involve the use of a management utility as well as configuration and setup for both the hardware and software.

The management utility can be functional to manage some or all aspects of the network. Information to be configured can include, for example, security settings (e.g., 802.1X enabled), media access control (MAC) address authorizations, virtual local area network (VLAN) authorizations, and link aggregation control protocol (LACP) enabled, etc. The port configuration utilities described herein can be used with any port configuration information that is to be used to configure a port.

The configuration of a device can be accomplished, for example, by defining a number of ports for which a number of port configuration properties are to be configured, grouping the number of ports into one or more port configuration groups, and defining the number of port configuration properties to be configured within a particular port configuration group. In various embodiments, the number of ports, the number of ports in each group, the number of groups, and/or the number of port configuration properties can be any suitable number.

In some embodiments, the defining of the number of ports for which a number of port configuration properties are to be configured, the grouping of the ports, and/or the defining of the number of port configuration properties can be accomplished via writing XML instructions. For example, the configuration instructions can be provided in a script (e.g., a set of executable instructions) that can be used to execute a process for configuring the ports.

In various embodiments, a user interface can be provided in which the user can enter the instructions into the interface. In such embodiments, the device or system can include instructions to extract the information entered into the user interface and facilitate the use of that information in the port configuration process.

This can be accomplished in various manners. For example, the device or system can extract such information and use further instructions to perform the port configuration process. In some embodiments, the device or system can import the extracted information into a configuration script (e.g., program) that can be executed to perform the port configuration process.

The port configuration properties can be one or more of the items of information described above. As discussed above, this information can be provided through user input or via a database having such information therein.

Grouping the number of ports can, for example, include grouping based upon a number of various characteristics of the number of ports. For example, in some embodiments, group can be accomplished by characteristics that are common between two or more ports (e.g., ports have a speed of 1,000 megabits per second (Mbps)).

In some embodiments, grouping can be accomplished by a number of characteristics (e.g., ports have a speed of 100 or 1,000 Mbps). In various embodiments, grouping can be accomplished by the numbers assigned to the ports (e.g., ports 1-100 or ports 3, 14, 35, 240, 699, etc.) or ports of one or more devices (e.g., ports on switch A).

Grouping can be determined by media type (e.g., ports connected by copper or fiber connections), in some embodiments. In various embodiments, a default instruction can be used to configure any devices not grouped in another way.

An all instruction can also be used, in some embodiments, to configure all devices with one or more port configuration properties. In some embodiments, several of these or other grouping statements can be used together define a number of different groups to be configured or a number of different properties can be defined for each group. Through use of such instructions, in various embodiments, for example, a first configuration property to be configured on all ports in a first group and a second configuration property to be configured on a subset of the first group can be defined.

Such embodiments can have ports that are included in more than one group (e.g., some 1,000 Mbps ports are also connect via copper connection and therefore, the properties to be configured from each group can be applied to this port). In such embodiments, the configuration can occur in various suitable manner with respect to maintaining or overwriting properties that have already bee configured with respect to a particular port. For example, in some embodiments, a first property to be provided can be maintained as subsequent configurations for groups are performed with respect to that port.

In various embodiments, the first property can be overwritten as subsequent configurations for groups are performed with respect to that port. Further, in some embodiments, the overwriting or maintaining of a property can be accomplished based upon a condition (e.g., overwrite if port is 1,000 Mbps and copper connected).

As discussed above, in some embodiments, the number of port configuration properties to be configured on each device within one or more port configuration groups can be defined to include a first configuration property to be configured on ports of a first group and a second configuration property to be configured on ports of a second group. Examples of such embodiments, can provide a first and second configuration property that are the same, such as a security setting, or a first and second configuration property that are different, such as a security setting and an item of VLAN authorization information.

In some embodiments, a first configuration property to be configured on a first group and a second configuration property to be configured on the first group can be defined. As applied to such examples of how the first and second configuration properties can be utilized, in embodiments where a first and second properties are both provided to the first group, if the properties are both security settings, then the setting can be maintained or overwritten as described above. If the first and second properties are different, then each item can be added to the configuration of the port (e.g., a security setting and an item of VLAN authorization information.

And, in some embodiments, a first configuration property (e.g., security setting) to be configured on a first group and a second configuration property (e.g., an item of VLAN information) to be configured on the first group and a second group can be defined. Accordingly, in such an example, the first group would have a security setting and an item of VLAN information configured for the ports of the first group and the ports of the second group would be configured with an item of VLAN information, but no security setting.

As mentioned previously, one or more of the functions described herein can, in some embodiments, be accomplished through use of a user interface. For example, the grouping of the number of ports can include grouping via a user interface. Further, in some embodiments, defining the number of ports for which a number of port configuration properties are to be configured can be accomplished via a user interface. A user interface can be of any type, such as an interface having a number of blanks to be filled in by a user, or a text box for a user to write instructions therein.

In such embodiments, extraction and/or translation instructions can be provided to extract the information regarding the configuration of the number of ports. This information can be provided to configuration programs (e.g., scripts) or the defined configuration properties can be translated into a number of configuration property statements that can communicate the configuration properties in an understandable manner to a number of different device types. In such embodiments, the translation can allow a general user interface to be utilized in a number of context in which the entries by a user may not be understood by the configuration instructions when initially entered by the user, but after translation, may be understood by the configuration instructions.

In various embodiments, the device or system can include instructions for grouping a number of ports for which a number of port configuration properties are to be configured into one or more port configuration groups, defining the number of port configuration properties to be configured on each device within one or more port configuration groups, and configuring each of the number of ports according to the defined number of port configuration properties.

In some embodiments, the device or system can include instructions for storing configured port configuration properties for a configured port in a configuration file (e.g., a set of executable instructions providing in one of a number of suitable formats that can be utilized by a computing device or system in the configuring of the number of ports. In various embodiments, at least one port configuration property in the port configuration file can be altered. For example, a template file can be provided and the template values (e.g., default values or old values) can be altered with the properties provided, for instance, by the user above.

In various embodiments, a configuration device can include, for example, a processor and memory having a number of instructions that are executable by the processor. The configuration device can be a system management station or other network device.

In some embodiments, the memory can include instructions for a variety of functions provided by the network, the network management station, and/or the computing device on which the instructions reside. The instructions provided can include instructions executable to manage implement the functionality described herein with respect to configuring devices.

With respect to various configuration device embodiments, typically configuration devices, such as management stations and the like can include one or more processors and memory having a number of instructions that are executable by the processor. In some such embodiments, the instructions provided to define a number of ports for which a number of port configuration properties are to be configured, group the number of ports into one or more port configuration groups, define the number of port configuration properties to be configured, select each of the number of ports within a particular port configuration group, and configure each selected port according to the defined number of port configuration properties. In some embodiments, the device can include one or more of the other instructions discussed herein to facilitate the configuration of the ports of the device and/or system.

FIG. 2 is an example of a number of port definition blocks that can be utilized in various embodiments of the present disclosure. In the embodiment illustrated in FIG. 2, the embodiment includes a script having a number of port definition blocks.

The script begins with a first opening statement 220<PortDef Range="All">. This statement is an instruction that is designed to configure all ports (e.g., a group that includes all of the ports). This statement defines the ports that are to be configured and defines one of the groups into which the ports are to be organized.

The "All" designation 222 is the portion of the instruction in the embodiment illustrated in FIG. 2 that defines the group. Provided below the first opening statement are a number of port configuration properties that are to be configured on the defined number of ports within the first group (i.e., all ports).

In the embodiment of FIG. 2, the port configuration properties 224 are a security setting "Enable 802.1X" and an LACP item indicating "No LACP". Accordingly, when the configuration process configures all ports, these properties will be configured for each port (e.g., in the port's configuration file). This first statement include a first end statement of <\PortDef>.

A second statement is provided below the first statement and begins with the second opening statement <PortDef Range="Speed="100, 1000">. This statement indicates that the port configuration properties provided below the second opening statement (and above the second end statement <\PortDef>) are to be configured on ports having speeds of either 100 or 1000. As is shown with the respect to the first opening statement, in the position where "port configuration properties" is provided, a number of port configuration properties can be substituted therein.

A third statement is provided below the second statement and begins with the third opening statement <PortDef Range="M1(1-3), M2(1,2), M3(1)>. This statement indicates that the port configuration properties provided below the third opening statement (and above the third end statement <\PortDef>) are to be configured on ports 1 through 3 on module 1, ports 1 and 2 on module 2, and port 1 on module 1. As is shown with respect to the second opening statement, in the position where "port configuration properties" is provided, a number of port configuration properties can be substituted therein.

A fourth statement is provided below the third statement and begins with the fourth opening statement <PortDef Range="All" Media="Fiber">. This statement indicates that the port configuration properties provided below the fourth opening statement (and above the fourth end statement <\PortDef>) are to be configured on all ports having a fiber connection type. As is shown with respect to the third opening statement, in the position where "port configuration properties" is provided, a number of port configuration properties can be substituted therein.

In some embodiments, as described above, the configuration instructions can configure the ports according to the first statement, then configure the ports according to the second statement, then configure the ports according to the third statement, and lastly, configure the ports according to the fourth statement. The order of configuration is not limited to a first statement to fourth statement arrangement and, therefore, in some embodiments, the order can be designed to be any suitable order, however. Further, the configuration instructions can be designed to overwrite or maintain configured properties, in many suitable manners, as discussed above.

Figure 3:
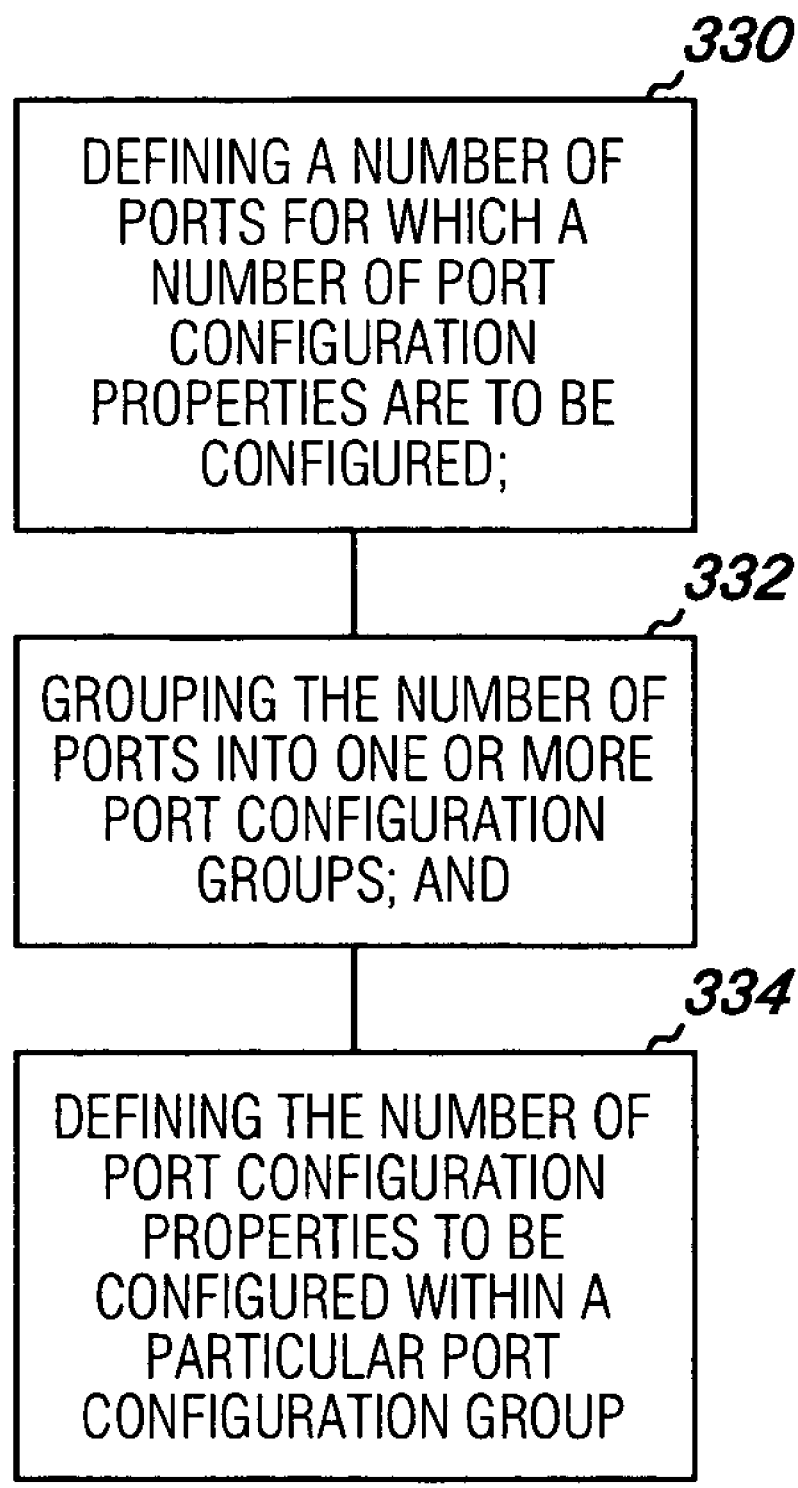
FIG. 3 is a block diagram illustrating a method embodiment according to the present disclosure.

FIG. 3 is a block diagram illustrating of a method embodiment according to the present disclosure. As illustrated at block 330 the method of FIG. 3 includes defining a number of ports for which a number of port configuration properties are to be configured.

The methods discussed herein can be performed by software, application modules, and/or executable instructions operable on the systems and/or devices shown herein or otherwise. The embodiments, however, are not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments can occur or be performed at the same point in time.

As shown at block 332, the method of FIG. 3 also includes grouping the number of ports into one or more port configuration groups. The method of FIG. 3 also includes defining the number of port configuration properties to be configured within a particular port configuration group, at block 354.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising:
defining a number of ports for which a number of port configuration properties are to be configured;
grouping the number of ports into one or more port configuration groups using a single configuration script including XML instructions that group the number of ports according to characteristics of the number of ports, wherein the one or more port configuration groups include ports on a plurality of network devices;
defining port configuration properties to be configured within a particular port configuration group; and
executing the single configuration script using a computing device having a processor and memory hardware to configure the ports within each port configuration group with the defined port configuration properties by translating the single configuration script into a number of configuration property statements that communicate the single configuration script in an understandable manner to each of the plurality of network devices respectively and deploying the single configuration script to the plurality of network devices.

2. The method of claim 1, wherein grouping the number of ports includes grouping based upon a port function type.

3. The method of claim 1, wherein grouping the number of ports includes grouping based upon a speed.

4. The method of claim 1, wherein grouping the number of ports includes grouping based upon a media type.

5. The method of claim 1, wherein grouping the number of ports includes grouping based upon an association with a network device.

6. The method of claim 1, wherein grouping the number of ports includes grouping, via a user interface, the number of ports into one or more port configuration groups.

7. The method of claim 1, wherein the method includes defining, via a user interface, the number of ports for which a number of port configuration properties are to be configured.

8. A non-transitory computer readable storage medium encoded with a plurality of instructions for causing a device to perform a method comprising:

grouping a number of ports for which port configuration properties are to be configured into one or more port configuration groups using a single configuration script including XML instructions that group the number of ports according to characteristics of the number of ports, wherein the one or more port configuration groups include ports on a plurality of network devices;

defining port configuration properties to be configured on each device within one or more port configuration groups,; and executing the single configuration script to configure each of the number of ports according to the defined port configuration properties by translating the single configuration script into a number of configuration property statements that communicate the single configuration script in an understandable manner to each of the plurality of network devices respectively and deploying the single configuration script to the plurality of network devices.

9. The medium of claim 8, wherein the method includes:

storing configured port configuration properties for a configured port in a configuration file; and altering at least one port configuration property in the port configuration file.

10. The medium of claim 8, wherein the method includes grouping the number of ports based upon a port number.

11. The medium of claim 10, wherein defining the number of port configuration properties to be configured on each device within one or more port configuration groups includes defining a first configuration property to be configured on ports of a first group and a second configuration property to be configured on ports of a second group.

12. The medium of claim 8, wherein defining the number of port configuration properties to be configured on each device within one or more port configuration groups includes defining a first configuration property to he configured on a first group and a second configuration property to be configured on the first group.

13. The medium of claim 8, wherein defining the number of port configuration properties to be configured on each device within one or more port configuration groups includes defining a first configuration property to be configured on a first group and a second configuration property to be configured on the first group and a second group.

14. The medium of claim 8, wherein defining the number of port configuration properties to be configured on each device within one or more port configuration groups includes defining a first configuration property to be configured on all ports in a first group and a second configuration property to be configured on a subset of the first group.

15. The medium of claim 14, wherein the second configuration property changes the configuration made by the first configuration property.

16. The medium of claim 8, wherein the method includes grouping the number of ports in a number of ranges of port numbers.

17. A configuration device comprising:

a processor;

memory having a number of instructions that are executable by the processor, the instructions provided to:

define a number of ports for which port configuration properties are to be configured;

group the number of ports into one or more port configuration groups using a single configuration script including XML instructions that group the number of ports according to characteristics of the number of ports, wherein the one or more port configuration groups include ports on a plurality of network devices;

define port configuration properties to be configured;

select each of the number of ports within a particular port configuration group; and execute the single configuration script using the configuration device to configure each selected port according to the defined port configuration properties by translating the single configuration script into a number of configuration property statements that communicate the single configuration script in an understandable manner to each of the plurality of network devices respectively and deploying the single configuration script to the plurality of network devices.

18. The device of claim 17, wherein instructions provided to configure each selected port according to the defined number of port configuration properties include instructions to configure a number of selected ports on one or more other devices.

* * * * *

UNITED STATES PATENT AND TRADEMARK OFFICE
CERTIFICATE OF CORRECTION

| | |
|---|---|
| PATENT NO. | : 7,898,986 B2 |
| APPLICATION NO. | : 11/590499 |
| DATED | : March 1, 2011 |
| INVENTOR(S) | : Daniel E. Ford et al. |

It is certified that error appears in the above-identified patent and that said Letters Patent is hereby corrected as shown below:

In column 9, line 13, in Claim 8, delete "groups,;" and insert -- groups; --, therefor.

In column 9, line 39, in Claim 12, delete "he" and insert -- be --, therefor.

Signed and Sealed this
Eleventh Day of September, 2012

David J. Kappos
*Director of the United States Patent and Trademark Office*